United States Patent Office 3,396,126
Patented Aug. 6, 1968

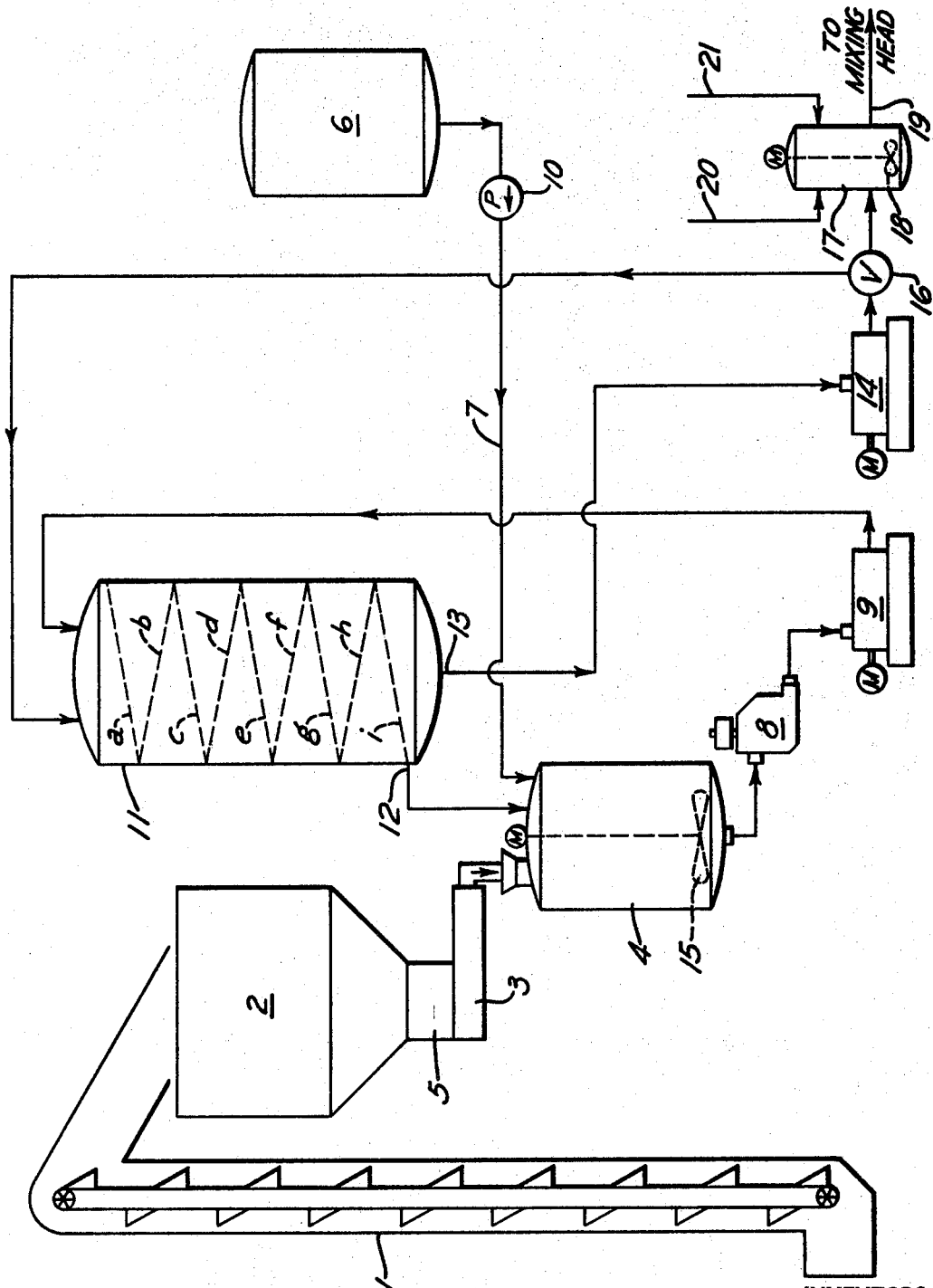

3,396,126
POLYURETHANES
Jesse Fred Gurley, Jr., Pittsburgh, Pa., Emile F. Harp, New Martinsville, W. Va., and Edward L. Reichard, Pittsburgh, Pa., assignors to Mobay Chemical Company, Pittsburgh, Pa., a corporation of Delaware
Filed May 24, 1966, Ser. No. 552,612
5 Claims. (Cl. 260—2.5)

This invention relates generally to polyurethanes and more particularly to an improved method of uniformly incorporating discrete particles of a solid filler into polyurethane products, most particularly polyurethane foams.

In the preparation of a polyurethane by the reaction between a polyisocyanate and a compound containing at least two reactive hydrogen atoms as determined by the Zerewitinoff method, it has been found that the physical properties of the resulting product, especially in the case of cellular products, is greatly enhanced by the inclusion of a solid filler in the formulation. The load bearing capability and density of the polyurethane product are greatly increased by the addition of filler, and this is particularly important with respect to a foam polyurethane because it adds weight to the characteristically light polyurethane product and gives the foam a feel similar to that of latex foam which is often preferred by the consumer.

However, great difficulty has been encountered in dispersing discrete particles of filler uniformly into a polyurethane formulation. Taking barium sulfate as an example, one finds that the particles agglomerate when mixed with a liquid of any type including the liquid components of a polyurethane reaction mixture. As a consequence, clusters of particles distribute themselves in a non-uniform manner in the liquid and entrap large quantities of air. The air is present due to adsorption on the large surface area of the micron sized barium sulfate particles. Although the density of suitable fillers is high, when ground into particles their density is reduced by about ⅔; on contact with liquid, the particles agglomerate, a crust is formed on the outside of the agglomerate, and air is entrapped with the particles within the encrusted mass. Once these particles are broken up in a mixing head, or when the components of the polyurethane are all mixed together, the air is released and becomes entrapped in the already reacting formulation.

The entrapped air causes bubbles and voids in the cellular polyurethane and irregularity in the cell structure.

In addition to the lack of homogeneity in the formulation, further problems arise because of the agglomeration and tendency of the fillers to settle such as, for example, pluggage in the apparatus being used for mixing or conveying the material. Because of the highly abrasive nature of the fillers most suitable for polyurethane formulations, the plugging and the settling out which invariably accompanies their use results in the erosion of the equipment which in some instances, can render it useless.

Some batch-type processes have been tried in an attempt to do away with these difficulties in the preparation of a polyurethane plastic material but they have not been found to be the complete solution to the problem. For example, a batch type operation would not permit flexibility in formulation or variability in concentration once the initial proportion of filler to reactants has been decided upon. As a corollary, if a rapid change from one formulation to another is required, whether or not a change in the concentration of the filler is necessary, the equipment would have to be shut down, drained out and cleaned, after which new materials would have to be fed into the system which would have to be readjusted before the change-over is completed. A further disadvantage of batch preparation is the excessively large size of equipment required for large production runs. Such a process is commercially undesirable and exemplifies the need for a more practical method.

It is therefore an object of this invention to provide a method for dispersing solid particles of filler in a polyurethane foam reaction mixture which is devoid of the foregoing difficulties.

A further object of this invention is to provide an apparatus which will permit rapid, uniform, continuous and versatile formulation of a polyurethane foam reaction mixture containing a filler.

Still another object of this invention is to provide a convenient method for including discrete particles of a solid filler in carefully controllable predetermined amounts uniformly throughout a polyurethane foam reaction mixture.

Yet another object of this invention is to provide a method and apparatus which will permit the uniform dispersion of discrete particles of solid filler in a polyurethane foam reaction mixture, and consequently in the finished polyurethane product, while also permitting rapid conversion from one concentration and/or formulation to another.

A still further object of this invention is to provide an apparatus which will permit all of the foregoing objects to be accomplished without undergoing pluggage or erosion and which is capable of being easily and rapidly cleaned without any need for dismantling.

These and other objects will become apparent from the following description and the accompanying drawing which diagrammatically illustrates the preferred apparatus of this invention.

The foregoing objects and others are accomplished in accordance with this invention, generally speaking, by providing a method for preparing a cellular polyurethane having discrete particles of a solid therein which comprises sprinkling solid particles into a liquid organic compound having hydrogen atoms capable of reacting with an organic polyisocyanate to form a polyurethane while the liquid is being stirred to suspend the particles of solid in the liquid, subjecting the resulting slurry to a shearing action to break any agglomerates of solid in the liquid into discrete particles, flowing the slurry in a thin film whereby entrapped air bubbles escape, diluting the resulting slurry with additional liquid organic compound having hydrogen atoms capable of reacting with an organic polyisocyanate to form a polyurethane, and thereafter mixing the resulting dispersion with an organic polyisocyanate under conditions which result in the formation of a cellular polyurethane.

The novel process described may be carried out in the novel apparatus illustrated in the drawing which includes a bucket elevator 1 or other suitable means for supplying solid particles to a bin 2 in which the solid particles are stored, a preliminary mixer of minimum inventory 4, volumetric or gravimetric feeder 3 which conveys the solid particles from the bin 2 into the preliminary mixer 4 which is equipped with an agitator 15, a liquid storage tank 6 in which the liquid organic compound having hydrogen atoms capable of reacting with an organic polyisocyanate to form a polyurethane is stored, and a pump 10 for moving the liquid organic compound out of the tank and through a conveying means 7 into the preliminary mixer 4; a high-shear device 8 which receives the slurry from the preliminary mixer 4 and a recycling means 9 to impel the discharge from the shearing device 8 into a deaerator 11 having disposed therein in zig-zag fashion, a series of inclined planes, $a$ through $i$, and having two exit passages 12 and 13, one of which 12, is connected to the preliminary mixer 4 and the other of which 13, is connected to a pumping means 14, which operates at an output rate less than the output rate of the recycling means to permit the deaerator to overflow into the mixing tank 4 and thus the pumping means 14 is connected through a 3- way valve 16 to an in-line mixer 17 equipped with an agitator 18, in which mixer an additional quantity of active hydrogen containing compound having no solid dispersed in it is added together with a blowing agent through inlets 20 and 21; the in-line mixer is connected to a mixing head by means of a conduit 19 through which the dispersion from the in-line mixer is conducted into the mixing head where it is mixed with the remaining constituents of the polyurethane foam formulation.

One of the most striking attributes of this apparatus is that it may be operated either in a batch-type process or in a continuous process. The preferred method of operation is the continuous one for which the apparatus was particularly designed, but should it be desired, a batch operation may be carried out with similar advantage. Even further, a continuous operation may be kept continuous even though the concentration of the components are being changed while being treated in the apparatus if desired.

Each of the aspects of the above-described apparatus is important within the framework of the whole. The storage hopper for the solid particles must vibrate in order to prevent the phenomenon of bridging which is the formation of an arc or cone of material in the hopper over the outlet area. Such bridging causes erratic feed and nonuniformity in the quantity of solid particles being passed into the preliminary mixer. The vibration may be imparted to the bin or hopper by means of a bin vibrator 5.

The feeder which conveys the solid particles from the area of the storage hopper to the preliminary mixer may be of any suitable type which will permit precise metering of the solids, preferably within ±2%, including a screw conveyor or a belt or ribbon conveyor. Preferably the feeder also vibrates in order to prevent packing of the solid particles, although a high speed conveyor may accomplish the same result and may also be used as well as any other type of feeder or conveyor which will not permit packing of the particles.

The preliminary mixer should be a minimum inventory tank equipped with an agitator and so shaped as to preclude vortexing and the addition of air to the mixture of the solids and the polyol. By minimum inventory is meant that the tank is only of a large enough size to permit the wetting of the particles and their dispersion in the liquid to form an initial slurry. This is a critical factor because the solids being added to the mixer will drop onto the surface of the polyol until the mass becomes dense enough to break through the surface of the liquid and fall to the bottom as a glob having an outer crust and an inner powdery nucleus, unless the diameter of the tank is small enough and the agitation is vigorous enough to preclude such a phenomenom. The agitation must be such that the particles are drawn under the surface of the liquid immediately when they reach the surface of the polyol, and for this purpose a two-propeller stirrer has been found to be the most expedient although any other type of agitator which will achieve this goal may be used.

The rate of addition of the solids which is precisely regulated by means of the feeder and the rate of addition of the active hydrogen containing compound which is regulated by the pump shown at 10 may be regulated with respect to one another in order to yield an initial slurry having the desired proportions. Any desired proportion or concentration of solid to polyol may be used to prepare the initial slurry from the most miniscule quantity up to about 80% by weight of solids in the active hydrogen containing compound, but preferably from about 60 to about 80%. If the concentration becomes too high, that is, much over 80%, then the tendency to plug the apparatus becomes so severe that it is impractical to handle such slurries; otherwise, any concentration between substantially negligible quantities and about 80% could be effectively handled in the apparatus. Notwithstanding, economic considerations dictate that one should use the highest feasible concentration of solid to polyol in the initial slurry in order to minimize the capital invested in the equipment since the more dilute the initial slurry, the larger the equipment required to process it. The additional quantity of active-hydrogen containing compound to be used in the later steps of the operation depends solely on the desired concentration of the solid particles in the final product. The blowing agent is preferably added to the formulation at the time of the dilution with the second volume of the organic compound, and possibly, even in a premixed admixture with it.

The mixture flows out of the preliminary mixer into a high-shear device such as a hammermill or any other suitable device of this type: preferably, a disintegrator is used. Any remaining particles which have not been wetted or which have agglomerated are broken up and a smooth slurry is obtained which is pumped into a deaerator. A recycle pump between the high-shear device and the deaerator pulls the slurry through the shearing device and impels it into the deaerator. Any suitable pump capable of operating with abrasive slurries may be used but a two-stage pump which operates on the principle of a moving cavity driven by a single speed sheave-and-belt arrangement is most preferable.

The deaerator is preferably a rectangular, open-top vessel having a sloped bottom and any desired number of removable trays sloped at an angle in zig-zag disposition within the structure. The number of planes and the slope of the planes in the deaerator will vary with the type of resin, the rates and the concentration of solids. The minimum number can best be determined experimentally in each case, and there is no maximum number that is dictated by technical reasons. The principle here is the important thing; that is, that even a highly viscous slurry is spread in a thin film, allowing the entrapped air to escape rapidly. The most preferred angle of the planes is a uniform 10° although any other angle and even non-uniform angles may be used. The slurry enters the deaerator through a flow distributor or curtain-type dispersion means preferably located at or near the open top of the vessel, and flows in a thin sheet or falling film of thinnest possible dimension down the trays to break up and dispel any air bubbles. A hose connection is provided between each set of trays for cleaning and for possible use in venting each deaeration stage should it be required in treating the cascading material. Thus, one of the advantages of the preferred deaerator in addition to its low-cost ease of construction, is that by means of hoses and trap doors at each deaeration stage, the deaerator planes can be raked and washed off if any settling out of the solids from the falling film takes place, without the necessity for shutting down and dismantling the equipment. The deaerator has two outlets preferably located at or near the lower end of the vessel, one of which leads back into the preliminary mixer while through the other the processed slurry is pumped into an in-line mixer through a feed pump capable of operating with abrasive slurries. Any such suitable pumping means may be used, but preferably, a variable speed pump operating on the principle of a moving cavity should be used to both move and meter the slurry.

The speed or output of the feed pump is so adjusted with reference to the speed or output of the recycle pump that the output of the recycle pump is at least from about 2 to about 5 times greater than that of the feed pump thus permitting from about 2 to about 4 passes through the preliminary mixer and deaerator before the slurry is channeled into the in-line mixer. Although a greater number of passes may be achieved, it is not advisable because a point of diminishing returns is reached at which the advantage of the smoothness of the slurry and the deaeration achieved is balanced against the disadvantage of the possible settling out of solids and addition of air from the recycling process.

The additional quantity of active hydrogen containing compound to be added in order to achieve the desired final concentration of the solids in the product is added to the slurry in the in-line mixer and uniformly blended with the slurry at that point. It is expedient to add the blowing agent to be used with the additional polyol in accordance with a preferred embodiment of this invention. The resulting blend is then channeled into a mixing head by any suitable means where it is mixed with the other components of a polyurethane formula and reacted to yield a cellular polyurethane product.

In the preferred embodiment of the apparatus described, between the feed pump and the in-line mixer, there is a three-way valve, the odd outlet of which is connected by means of a conduit to the deaerator. This expedient is important since, once the system is shut down, the solids will settle out. The three-way valve allows a recycle into the deaerator as a simple and effective means of rejuvenating the slurry and illustrates again the superiority of the present apparatus which need not be dismantled after each shut-down or change in formulation.

Any suitable filler or solid particles may be added by means of this invention including pigments, various minerals and salts such as zirconium silicate, gypsum, limestone, chalk, talc, silica, zirconium oxide, silicone oxide mixtures, calcium carbonate, carbon and coal fines, clay and the like and mixtures thereof. Any and all solid particulate types of materials may be used and are contemplated. Most preferably in the preparation of polyurethanes, however, barium sulfate should be used because this filler is particularly advantageous for improving the physical properties, including the load bearing characteristics of a polyurethane product at a given density. The size of the particles of filler can vary over a wide range but preferably will fall within the range of from about 20 to about 600 mesh as determined by a Tyler screen. The invention can also be used to suspend particles of shredded or ground foam, particularly polyurethane foam, either alone or in combination with a suitable filler in a polyurethane foam reaction mixture.

Any suitable organic compound containing at least two active hydrogen containing groups as determined by the Zerewitinoff method may be used to react with isocyanates in the preparation of the cellular polyurethane. The active hydrogen containing compounds contemplated may contain any of the following types of active hydrogen containing groups among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including aromatic, aliphatic and heterocyclic diamines, triamines, tetramines and the like; as well as mixtures thereof. Compounds which contain two or more different groups within the above-defined classes may also be used in accordance with the process of the present invention such as, for example, amino alcohols which contain an amino group and a hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 with an hydroxyl number within the range of from about 25 to about 800 and acid numbers, where applicable, below about 5.

Any suitable hydroxyl polyester, including lactone polyesters may be used, such as, for example, the reaction product of a polycarboxylic acid and polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexane-dicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-petane diol, 1,6-hexane diol, 1,7-heptane diol, glycerine, trimethylolpropane, 1,3,6-hexanetriol, triethanolamine, pentaerythritol, sorbitol and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth herein or they may be made using the same components that make up the hydroxyl polyester with only a portion of the components being a diamine such as ethylene diamine and the like.

Any suitable polyhydric polyalkylene ether may be used such as, for example, the condensation product of an alkylene oxide beginning with any suitable initiator. The initiator may be a difunctional compound, including water, so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed therein. It is preferred that the initiator, including as such amines, alcohols and the like, have from 2 to 8 active sites to which the alkylene oxides may add. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initator may be used including, for example, water, polyhydric alcohols, preferably having 2 to 8 hydroxyl groups, amines, preferably having 2 to 8 replaceable hydrogen atoms bonded to nitrogen atoms and the like. Phosphorous acids may also be used as initiators but the phosphorous compounds are somewhat peculiar and require different modes of preparation as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many suitable processes for the preparation of polyhydric polyalkylene ethers including U.S. Patents 1,922,459, 3,009,939 and 3,061,625 or by the process disclosed by Wurtz in 1859 and discussed in the Encyclopedia of Chemical Technology, volume 7, pages 257 to 262, published by Interscience Publishers, Inc. (1951).

Specific examples of initiators are water, ethylene glycol, propylene glycol, gylcerine, trimethylol propane, pentaerythritol, arabitol, sorbitol, maltose, sucrose, ammonia, diethanolamine, triethanolamine, dipropanolamine, tripropanolamine, diethanolpropanolamine, tributanolamine, 2,4-tolylene diamine, 4,4′-diphenylmethane diamine, p,p',p''-triphenylmethane triamine, ethylene diamine, propylene diamine, propylene triamine, N,N,N',N'-tetrakis(2 - hydroxypropyl)ethylene diamine, diethylene triamine and the like. The phosphorus containing polyols are more fully described below.

Any suitable polyhydric polythioether may be used such as, for example, the condensation product of the thiodiglycol or the reaction product of a polyhydric alcohol, such as are disclosed herein for the preparation of the hydroxyl polyesters, with any other suitable thioetherglycol. Other suitable polyhydric polythioethers are disclosed in U.S. Patents 2,862,972 and 2,900,368.

Any suitable polyacetal may be used such as, for example, the reaction product of formaldehyde or any other suitable aldehyde with a polyhydric alcohol such as those disclosed herein for the preparation of the hydroxyl polyesters.

Any suitable aliphatic polyol may be used such as, for example, alkane diols including, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol, 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any silicone resins which contain free hydroxyl groups such as, for example,

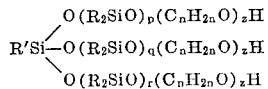

wherein R and R' are alkyl radicals having 1 to 4 carbon atoms; $p+q+r$ has a minimum value of 3 and $(C_nH_{2n}O)$ is a mixed polyoxyethylene oxypropylene group containing from 15 to 19 oxyethylene units and from 11 to 15 oxypropylene units with $z$ equal to from about 26 to about 34, may also be used as polyhydroxy compounds as well as phenol-formaldehyde condensates. Addition products of alkylene oxides to ammonia, amines or hydrazines such as triethanolamine, triisopropanolamine and the like as well as polycarbonates having free hydroxyl groups may also be used.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as p-aminoaniline, 1,5-diaminonaphthalene, 2,4 - diaminotoluene, 1,3,5 - benzene triamine, 1,2,3 - benzene triamine, 1,4,5,8 - naphthalene tetramine and the like; aliphatic polyamines such as, for example, ethylene diamine, 1,3-propylene diamine, 1,4-butylene diamine, 1,3-butylene diamine, diethylene triamine, triethylene tetramine, 1,3,6-hexane triamine, 1,3,5,7-heptane tetramine and the like; heterocyclic polyamines such as, for example, 2,6-diamino pyridine, 2,4-diamino-5-aminoethyl pyrimidine, 2,5-diamino-1,3,4-thiadiazole and the like.

Some useful compounds having predominantly secondary hydroxyl groups are castor oil, brominated or hydrogenated castor oil, reaction products of castor oil with polyhydric alcohols, octadene-9-diol-1,12, polyether alcohols derived from propylene oxide and a polyhydric alcohol, an amine, hydrazine or ammonia, epoxy resins produced from polyhydric alcohols or phenols with epichlorohydrin in alkaline solution and the like and mixtures thereof.

Phosphorous containing compounds are often advantageously used because of the flame retarding effect which they impart to the resulting plastics. These compounds often contain 1 or 2 phosphorous atoms such as a nucleus through either phosphate or phosphite type linkages. The phosphate compounds are advantageously prepared by condensing a mixture of phosphorous pentoxide and water with an alkylene oxide. It is advantageous to use mixtures of phosphorous pentoxide and water which correspond to about 80 percent phosphorous pentoxide and about 20 percent water, but any amount within the range of about 65 percent to 90 percent phosphorous pentoxide and the balance water may be used, the whole range being contemplated. The phosphites are advantageously prepared in accordance with the method of U.S. Patent 3,009,929 where triphenyl phosphite, for example, is reacted with a polypropylene ether glycol to prepare a product having a molecular weight of about 500; other suitable processes are also disclosed in the patent. It is also possible to use polyethers based on phosphorus which contain nitrogen atoms in addition to the phosphorous atoms. These compounds may be represented by the general formula

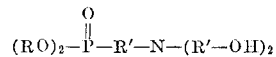

wherein R is phenyl or a lower alkyl group such as, for example, methyl, ethyl, propyl, butyl and the like and R' is an alklene radical which preferably contains from 1 to 4 carbon atoms such as methylene, ethylene, 1,2-propylene, 1,4-butylene and the like; a preferred compound is dioxyethylene-N,N - bis(2 - hydroxyethyl)aminomethyl phosphonate.

Mixtures of any of the compounds of any of the classes set forth hereinbefore may be used and such compounds may also contain other substituents including halogen atoms such as, for example, chloro, bromo, iodo and the like; nitro groups, alkoxy radicals such as, for example, methoxy, ethoxy, propoxy, butoxy and the like; carboalkoxy groups such as, for example, carbomethoxy, carbethoxy and the like; dialkyl amino groups such as, for example, dimethyl amino, dipropyl amino, methylethyl amino and the like; mercapto, carbonyl, thiocarbonyl, phosphoryl, phosphato and the like groups.

Any suitable polyisocyanate may be used to prepare the polyurethane such as, for example, aliphatic, araliphatic or aromatic polyisocyanates including phenylene diisocyanates, 2,4- and/or 2,6-toluylene diisocyanate, diphenylmethane - 4,4' - diisocyanate, 4,4'-bis-phenylene diisocyanate, 1,5-naphthalene diisocyanate, hexamethylene diisocyanate, decamethylene diisocyanate, ethylene diisocyanate, butylene diisocyanate, dipropyldiisocyanato ether, 2,2-dimethylpentylene diisocyanate, 3-methoxyhexamethylene diisocyanate, 1,4-butylene glycol propylether diisocyanate, undecamethylene diisocyanate, dodecamethylene diisocyanate, 1,3-dimethylbenzene diisocyanate, 1,4-dimethylbenzene diisocynate, 1,2-dimethylcyclohexane diisocyanate, 1,4-diethylbenzene diisocyanate, 1,4-dimethylnaphthalene diisocyanate, 1,5-dimethylnaphthalene diisocyanate, biuret triisocyanates, e.g., from 3 mols hexamethylene diisocyanate and 1 mol water, carbodiimides with free terminal NCO groups, e.g., from polyisocyanates with catalysts such as phosphine oxides, dimers and trimers of any polyisocyanates having free NCO groups including those mentioned herein, 1-methylbenzyl - 2,4,6 - triisocyanate, 1,3,5-trimethylbenzyl - 2,4,6 - triisocyanate, naphthalene-1,3-7-triisocyanate, 3 - methyldiphenylmethane-4,6,4'-triisocyanate, 4,4'-dimethyldiphenylmethane - 2,2',5,5'-tetraisocyanate, triphenylmethane - 4,4',4'' - triisocyanate and the like. Further addition reaction products of an excess of a polyisocyanate with an alcohol such as trimethylolpropane, glycerol, hexanetriol, a glycol, or a lower molecular weight polyester such as castor oil, or the reaction product of an excess of any suitable isocyanate with an acetal in accordance with German patent specification 1,072,385 or with any of the hereinbefore enumerated active-hydrogen containing compounds may be used as desired, as well as the isocyanates mentioned in German patent specifications 1,022,789 and 1,027,394 as well as in U.S. Reissue Patent 24,514.

Polyurethane plastics may be prepared by a prepolymer technique wherein an excess of organic polyisocyanate is reacted in a first step with the polyol to prepare a prepolymer having free —NCO groups which is then reacted in a second step with the dispersion from the in-line mixer to prepare a foam. Alternately, the components may be reacted in a single step.

In order to fabricate a plastic having a cellular structure a blowing agent must be used to emit a gas which subsequently is entrapped in the plastic material causing it to expand. Water may be used to blow the foam, in which case an excess of the isocyanate must be used correspondingly to the amount of water being used in order to react with the water to produce carbon doxide. Instead of or in addition to water, however, other materials may be used as blowing agents, including low boiling hydrocarbons such as pentane, hexane, heptane, pentene, heptene and the like; azo compounds such as azohexahydrobenzodinitrile and the like, halogenated hydrocarbons such as dichlorodifluoroethane, dichlorodifluoromethane, trichlorofluoromethane, vinylidene chloride, methylene chloride and the like. A product having the best load bearing properties at optimum density is produced when both water and a halohydrocarbon are used.

It is often advantageous in the production of cellular polyurethane plastics to include other additives in the reaction mixture in addition to the solid particulate material such as, for example, emulsifiers and foam stabilizers and the like. It is particularly advantageous to employ an emulsifier such as, for example, sulphonated castor oil and/or a foam stabilizer such as a silicone oil including, for example, a polydimethyl siloxane or an alkyl silane polyoxyalkylene block copolymer; the latter type of silicone oil is disclosed in U.S. Patent 2,834,748. When polyhydric polyalkylene ethers are used in the preparation of a cellular polyurethane plastic, it is preferred to employ a silicone oil such as one of those defined in the above patent which comes within the scope of the formula

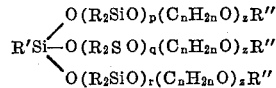

wherein R, R' and R" are alkyl radicals having 1 to 4 carbon atoms, $p$, $q$ and $r$ each have a value of from 4 to 8 and $(C_nH_{2n}O)$ is a mixed polyoxyethylene oxypropylene group containing from 15 to 19 oxyethylene units and from 11 to 15 oxypropylene units with $z$ equal to from about 26 to about 34. The most preferred compound is one having the formula

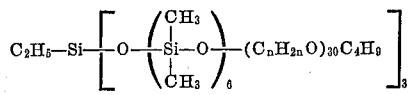

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537, 668,478 and 670,091, and may therefore have the formula

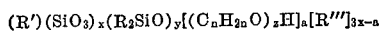

wherein $x$ is an integer and represents the number of trifunctional silicone atoms bonded to a single monovalent or polyvalent hydrocarbon radical, R'; $a$ is an integer having a value of at least 1 and represents the number of polyoxyalkylene chains in the block copolymer; $y$ is an integer having a value of at least 3 and denotes the number of difunctional siloxane units; $n$ is an integer of from 2 to 4 denoting the number of carbon atoms in the oxyalkylene group; and $z$ is an integer having a value of at least 5 and denotes the length of the oxyalkylene chain. It is to be understood that such compositions of matter are mixtures of block copolymers wherein $y$ and $z$ are of different values and that any method for determining the chain length of the polysiloxane chains and the polyalkylene chains can only give values which represent average chain lengths. In the above formula, R represents monovalent hydrocarbon radicals, such as alkyl, aryl or aralkyl radicals and the polyoxyalkylene chain terminates with a hydrogen atom; R'" is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

Any suitable catalyst may be used to accelerate the reaction, including, for example, tertiary amines such as dimethyl benzyl-amine, dimethyl stearyl amine, permethylated diethylene triamine, N-methyl-N'-dimethyl-aminoethyl piperazine, N,N'-endoethylene piperazine, N-alkyl morpholines; tertiary aminoethers such as, for example, 1-alkoxy-3-dialkylaminopropane, tertiary amines with ester groups, salts of tertiary amines, especially with organic acids such as, for example, oleic acid, benzoic acid and the like, dibutyl tin dilaurate, dibutyl tin di-2-ethyl hexoate, dibutyl - tin - bis(dimethylaminocaproate), stannous octoate, stannous oleate, lead napthenate, ferric acetylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," J. W. Britain and P. G. Gemeinhardt, Journal of Applied Polymer Science, volume IV, Issue No. 11, pages 207–211 (1960).

The invention is further illustrated but not limited by the following examples in which all parts and percentages are by weight unless otherwise specified.

EXAMPLE 1

Referring to the drawing, the rate of addition of barium sulfate particles from the vibrating bin 2 into the preliminary mixer 4 is adjusted with respect to the rate of addition of a condensation product of glycerine and propylene oxide having a molecular weight of about 3,000 from the storage tank 6 so that about 45 parts of barium sulfate to about 30 parts of the triol are mixed together in the preliminary mixer to disperse the particles of barium sulfate in the polyol to form a slurry. The slurry flows out of the mixer into a disintegrator 8 wherein any agglomerates of the barium sulfate are broken up into discrete particles. The slurry is then impelled into the deaerator 11 wherein it flows in a thin film across inclined planes to disperse any air bubbles remaining in the slurry. The slurry is then pumped into an in-line mixer into which metered amounts of methylene chloride and additional polypropylene ether triol are added through inlets 20 and 21 to yield a uniform dispersion of about 30 parts of barium sulfate and about 4.5 parts of methylene chloride in about 100 parts of the polypropylene ether triol.

About 100 parts of the resulting dispersion are then metered into a suitable mixing head such as is disclosed in U.S. Reissue 24,514 together with about 0.35 part of stannous octoate, about 0.15 part of triethylene diamine, about 1.5 parts of a stabilizer having the formula

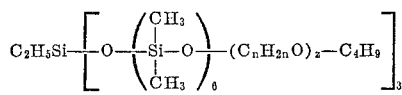

wherein $(C_nH_{2n}O)$ represents about 17 oxyethylene units and about 13 oxypropylene units and $z$ is equal to about 30, about 3.6 parts of water and about 45.7 parts of a mixture of 80 percent 2,4-tolylene diisocyanate and about 20 percent 2,6-tolylene diisocyanate. The components are then mixed in the apparatus. The resulting mixture is discharged from the apparatus and chemical reaction occurs almost instantaneously with the reaction mixture beginning to foam and expand. After chemical reaction has subsided the expanded cellular material solidifies into a cellular polyurethane having a density of about 1.4 lbs./cu. ft.

EXAMPLE 2

The rate of addition of barium sulfate particles from a vibrating bin into a preliminary mixer is adjusted with respect to the rate of addition of a condensation product of hexanetriol-1,2,6 and propylene oxide having a molecular weight of about 500 from a storage tank so that about 120 parts of barium sulfate to about 30 parts of the triol are mixed together in the preliminary mixer to form a slurry. The slurry is then sheared to break up any agglomerates and flowed in a thin film across inclined planes to disperse any entrapped air bubbles. The slurry is then pumped into an in-line mixer into which metered amounts of trichlorofluoromethane and additional triol are added to yield a uniform dispersion of about 30 parts of barium sulfate and about 9 parts of trichlorofluoromethane in about 100 parts of the triol.

About 100 parts of the resulting dispersion are then metered into a suitable mixing head such as is disclosed in U.S. Reissue 24,514 together with about 1.0 part stannous oleate, about 2.5 parts water, about 91 parts of a mixture of about 80 percent 2,4-tolylene diisocyanate and about 20 percent 2,6-tolylene diisocyanate and about 1.5 parts of a stabilizer having the formula

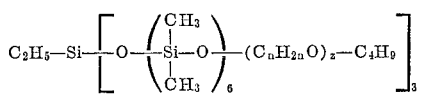

wherein $(C_nH_{2n}O)$ represents 17 oxyethylene units and about 13 oxypropylene units and $z$ is equal to about 30. The components are then mixed in the apparatus. The resulting mixture is discharged from the apparatus and chemical reaction occurs almost instantaneously with the reaction mixture beginning to foam and expand. After chemical reaction has subsided the expanded cellular material solidifies into a rigid cellular polyurethane foam having a density of about 1.3 lbs./cu. ft.

It is to be understood that any and all types of filled polyurethane foam materias may be prepared according to the process of this invention, from the most flexible to the most rigid, and that such cellular polyurethane materials can be used in any and all applications for which foam materials are suited, such as, for example, in cushions, furniture, topper pads, dashboards and so on. Therefore, any active hydrogen containing compound may be reacted with any polyisocyanate in a reaction mixture containing any desired blowing agent, catalyst, emulsifier, stabilizer or any other type of additive, and any solid particulate material may be added to the active hydrogen containing compound in accordance with this invention as hereinbefore set out, whether it is merely a filler or a pigment or the like. Furthermore, the amounts of the various components with respect to one another are capable of wide variation with the exception of the critical limitation concerning the amount of solid in the liquid to form the initial slurry in the first step of the process of this invention.

Although the invention has been described in considerable detail in the foregoing, it is to be understood that such detail is solely for the purpose of illustration and that many variations can be made by those skilled in the art without departing from the spirit and scope of the invention except as set forth in the claims.

In addition, although the invention has been described solely with reference to cellular polyurethane materials, it is to be understood that the invention is equally applicable to the production of non-cellular elastomeric polyurethanes by merely deleting the blowing agent. Therefore, all of the foregoing examples and discussion applies to the preparation of elastomeric, non-cellular polyurethanes with the deletion of passages directed to the blowing agent.

What is claimed is:

1. A method for preparing a cellular polyurethane having discrete particles of a solid therein which comprises sprinkling solid particles into a liquid organic compound having hydrogen atoms capable of reacting with an organic polyisocyanate to form a polyurethane while said liquid is being stirred, thereby suspending particles of the solid in the liquid to form a slurry, subjecting the resulting slurry to a shearing action thereby breaking agglomerates of solid therein into discrete particles, flowing the slurry in a thin film whereby entrapped air bubbles escape, diluting the resulting slurry with additional liquid organic compound having hydrogen atoms capable of reacting with an organic polyisocyanate to form a polyurethane, and thereafter mixing the resulting dispersion with an organic polyisocyanate under conditions which result in the formation of a cellular polyurethane.

2. The method of claim 1 wherein the particles being dispersed are barium sulfate particles.

3. The method of claim 1 wherein from about 1.5 to about 4 parts of the particles per part of the reactive hydrogen containing compound form the slurry.

4. The method of claim 1 wherein a blowing agent is added with the additional quantity of the active hydrogen containing compound.

5. A method for preparing a polyurethane having discrete particles of a solid therein which comprises sprinkling solid particles into a liquid organic compound having hydrogen atoms capable of reacting with an organic polyisocyanate to form a polyurethane while said liquid is being stirred, thereby suspending particles of the solid in the liquid to form a slurry, subjecting the resulting slurry to a shearing action thereby breaking agglomerates of solid therein into discrete particles, flowing the slurry in a thin film whereby entrapped air bubbles escape, diluting the resulting slurry with additional liquid organic compound having hydrogen atoms capable of reacting with an organic polyisocyanate to form a polyurethane, and thereafter mixing the resulting dispersion with an organic polyisocyanate under conditions which result in the formation of a polyurethane.

References Cited

UNITED STATES PATENTS

| | | | |
|---|---|---|---|
| 3,004,921 | 10/1961 | Stossel | 252—309 |
| 3,046,172 | 7/1962 | Reid | 154—46 |
| 3,227,666 | 1/1966 | Showalter | 260—2.5 |
| 3,256,218 | 6/1966 | Knox | 260—2.5 |
| 3,298,976 | 1/1967 | Reinhart | 260—2.5 |

DONALD E. CZAJA, *Primary Examiner.*

M. FEIN, *Assistant Examiner.*